United States Patent
Jeong et al.

(10) Patent No.: US 12,475,119 B2
(45) Date of Patent: Nov. 18, 2025

(54) OPERATOR MOVEMENT OPTIMIZATION TECHNIQUE FOR PROCEDURES

(71) Applicant: SAP SE, Walldorf (DE)

(72) Inventors: Taeyoung Jeong, Seoul (KR); Kisung Park, Seoul (KR); Chanho Jeong, Seoul (KR); Ki Hong Kim, Seoul (KR); Young-Koo Lee, Seoul (KR); Md Mostofa Kamal Rasel, Dacca (BD)

(73) Assignee: SAP SE, Walldorf (DE)

( * ) Notice: Subject to any disclaimer, the term of this patent is extended or adjusted under 35 U.S.C. 154(b) by 259 days.

(21) Appl. No.: 17/561,104

(22) Filed: Dec. 23, 2021

(65) Prior Publication Data

US 2023/0048391 A1    Feb. 16, 2023

Related U.S. Application Data

(60) Provisional application No. 63/231,893, filed on Aug. 11, 2021.

(51) Int. Cl.
  *G06F 16/24* (2019.01)
  *G06F 16/2453* (2019.01)

(52) U.S. Cl.
  CPC .. *G06F 16/24542* (2019.01); *G06F 16/24537* (2019.01)

(58) Field of Classification Search
  CPC .............................................. G06F 16/24542
  See application file for complete search history.

(56) References Cited

U.S. PATENT DOCUMENTS

| | | | |
|---|---|---|---|
| 8,005,818 B2* | 8/2011 | Perry | G06F 16/24537 707/765 |
| 8,661,023 B1* | 2/2014 | Chun | G06F 16/9027 707/718 |
| 10,740,514 B1* | 8/2020 | Zhang | G06F 30/3308 |
| 11,455,152 B2* | 9/2022 | Zhang | G06N 20/00 |
| 11,475,005 B2* | 10/2022 | Vogelsgesang | G06F 16/24539 |
| 2008/0002740 A1* | 1/2008 | Ramachandran | H04L 69/32 370/469 |
| 2010/0083240 A1* | 4/2010 | Siman | G06F 16/245 717/144 |

(Continued)

OTHER PUBLICATIONS

Binnig et al.: "SQL Script: Efficiently Analyzing Big Enterprise Data in SAP HANA", 20 pages.

(Continued)

*Primary Examiner* — Mohammad S Rostami
(74) *Attorney, Agent, or Firm* — Fountainhead Law Group, PC

(57) ABSTRACT

In some embodiments, a method receives a statement graph for a procedure that is used to access data and determines a set of producer statements and a set of consumer statements in the statement graph. A producer statement produces a variable for a consumer statement, and the consumer statement consumes the variable from the producer statement. The method optimizes the statement graph to generate an optimized procedure by moving an operator from a consumer statement to a producer statement or by moving an operator from a producer statement to a consumer statement. The optimized procedure is output based on the optimized statement graph.

19 Claims, 14 Drawing Sheets

(56) References Cited

U.S. PATENT DOCUMENTS

| | | | | |
|---|---|---|---|---|
| 2012/0323885 | A1* | 12/2012 | Wang | G06F 16/2456 707/E17.054 |
| 2014/0304251 | A1* | 10/2014 | Bornea | G06F 16/9024 707/718 |
| 2015/0074034 | A1* | 3/2015 | Ait-Mohktar | G06F 16/835 706/50 |
| 2018/0096166 | A1* | 4/2018 | Rogers | H04L 63/04 |
| 2018/0121315 | A1* | 5/2018 | Abadi | G06F 8/71 |
| 2018/0129581 | A1* | 5/2018 | Abadi | G06F 8/71 |
| 2018/0253473 | A1* | 9/2018 | Ziegler | G06F 16/24537 |
| 2019/0095309 | A1* | 3/2019 | Levit-Gurevich | G06F 11/3466 |
| 2019/0188006 | A1* | 6/2019 | Ritter | G06F 8/433 |
| 2019/0278771 | A1* | 9/2019 | Bozkaya | G06F 16/24522 |
| 2020/0089491 | A1* | 3/2020 | Sahu | G06F 8/75 |
| 2020/0142990 | A1* | 5/2020 | Freedman | G06F 16/2455 |
| 2020/0159934 | A1* | 5/2020 | Yamaguchi | G06F 16/9024 |
| 2020/0175102 | A1* | 6/2020 | Sobran | G06F 40/30 |
| 2020/0218535 | A1* | 7/2020 | Alomari | G06F 8/425 |
| 2020/0265090 | A1* | 8/2020 | Hilloulin | G06F 16/9024 |
| 2020/0401386 | A1* | 12/2020 | Punathil | G06F 8/433 |
| 2021/0232390 | A1* | 7/2021 | Hwang | H04L 41/16 |
| 2021/0241108 | A1* | 8/2021 | Chai | G06N 3/045 |
| 2021/0263779 | A1* | 8/2021 | Haghighat | G06F 9/5061 |
| 2021/0279338 | A1* | 9/2021 | Bowman | G06F 21/577 |
| 2021/0286718 | A1* | 9/2021 | Ravindar | G06F 8/443 |
| 2021/0319023 | A1* | 10/2021 | Ding | G06F 16/24544 |
| 2021/0397148 | A1* | 12/2021 | Ota | G05B 19/056 |

OTHER PUBLICATIONS

Chen et al.: "Query Grouping-Based Multi-Query Optimization Framework for Interactive SQL Query Engines on Hadoop", Apr. 24, 2018, Wileyonlinelibrary.com, 16 pages.

Gulyassy et al.: "Material Planning with SAP", Galileo Press, 2009, 33 pages.

Liewen et al.: "A Transformation-Based Approach To Optimizing Loops In Database Programming Languages", University of Wisconsin, Computer Sciences Department, Jun. 1992, 10 pages.

Palkar, et al.: "Weld: A common runtime for high performance data analytics." CIDR 2017—8th Biennial Conference on Innovative Data Systems Research, 9 pages.

Ramachandra et al.: "BlackMagic: Automatic Inlining of Scalar UDFs into SQL Queries with Froid", Proceedings of the VLDB Endowment, vol. 12, No. 12, 4 pages.

Duta et al.: "Compiling PL/SQL Away", 10th Annual Conference on Innovative Data Systems Research, Jan. 12-15, 2020, 8 pages.

Zhou et al.: "Efficient Exploitation of Similar Subexpressions for Query Processing", SIGMOD, Jun. 12-14, 2007, 12 pages.

Silva et al.: "Exploiting Common Subexpressions For Cloud Query Processing", 12 pages.

Emani et al.: "Extracting Equivalent SQL From Imperative Code in Database Applications", Indian Institute of Technology, SIGMOD, Jun. 26-Jul. 1, 2016, 16 pages.

Ramachandra et al.: "Froid: Optimization of Imperative Programs in a Relational Database", Proceedings of the VLDB Endowment, vol. 11, No. 4, Aug. 2018, 13 pages.

Diaconu et al.: "Hekaton: SQL Server's Memory-Optimized OLTP Engine", SIGMOD, Jun. 22-27, 2013, 12 pages.

Cheung et al.: "Inferring SQL Queries Using Program Synthesis", MIT CSAIL, downloaded Aug. 9, 2012, 12 pages.

Park et al.: "Iterative Query Processing Based On Unified Optimization Techniques", SIGMOD, Jun. 30-Jul. 5, 2019, 15 pages.

Mistry et al.: "Materialized View Selection and Maintenance Using Multi-Query Optimization", Downloaded Mar. 2, 2000, 22 pages.

Onizuka et al.: "Optimization for Iterative Queries on MapReduce", Proceedings of the VLDB Endowment, vol. 7, No. 4, Sep. 1-5, 2014, 12 pages.

Cheung et al.: "Optimizing Database-Backed Applications With Query Synthesis", MIT CSAIL, Jun. 16-19, 2013, 12 pages.

Guravannavar et al.: "Rewriting Procedures For Batched Bindings", VLDB, Aug. 24-30, 2008, 17 pages.

Jindal et al.: "Selecting Subexpressions to Materialize at Datacenter Scale", Proceedings of VLDB Endowment, vol. 11, No. 7, Aug. 2018, 13 pages.

Cheung et al.: "Sloth: Being Lazy is a Virtue (When Issuing Database Queries)", SIGMOD Jun. 22-27, 2014, 12 pages.

Meehan et al.: "S-Store: Streaming Meets Transaction Processing", Proceedings of VLDB Endowment, vol. 8, No. 13, Sep. 5-9, 2016, 12 pages.

* cited by examiner

200 →

```
create procedure ex_proc (in threshold bigint,
                          out fres result_type) as
begin
S₁   declare sales_cnt integer;
S₂   c_item_date = select d_year, i_category,
                          cs_quantity as sales_cnt
                 from catalog_sales
                 join item on i_item_sk=cs_item_sk
                 join date_dim on d_date_sk=cs_sold_date_sk
                 left join catalog_returns
                     on (cs_order_number = cr_order_number
                     and cs_item_sk = cr_item_sk);
S₃   select sum(sales_cnt) into sales_cnt
            from :c_item_date where i_category = 'Jewelry';
S₄   if sales_cnt > threshold then
S₅     res = select sum(sales_cnt) as yearly_sales,
                   d_year, i_category
            from :c_item_date
            group by d_year, i_category;
S₆   else
S₇     res = select 0 as yearly_sales, d_year, i_category
            from :c_item_date
            group by d_year, i_category;
S₈   end if;
S₉   fres = select yearly_sales, d_year
            from :res where i_category = 'Jewelry';
S₁₀ end
```

OPERATOR MOVEMENT OPTIMIZATION TECHNIQUE FOR PROCEDURES

CROSS REFERENCE TO RELATED APPLICATIONS

Pursuant to 35 U.S.C. § 119(e), this application is entitled to and claims the benefit of the filing date of U.S. Provisional App. No. 63/231,893 filed Aug. 11, 2021, the content of which is incorporated herein by reference in its entirety for all purposes.

BACKGROUND

Querying of databases may use complex business logic that is typically represented as a combination of imperative constructs and declarative statements (e.g., SQL statements). The combination is used because a pure declarative description cannot provide imperative functionalities, such as branches, loops, or exception handlers. The difference between imperative statements and declarative statements is that imperative statements may change a program's state and declarative statements may focus on what the program should accomplish without specifying how a program should achieve the result. Imperative procedures may be used to describe hybrid behavior of both imperative constructs and declarative statements. For example, imperative procedures may be used for iterative or conditional executions for complex analytical queries that include a large number of join and grouping operators.

Typically, a database system may attempt to optimize the procedure when performing a query on the database. However, optimizing a procedure that includes both declarative and imperative language may be difficult for query optimizers. The problem may result in what is referred to as "impedance mismatch" between the two distinct programming paradigms being used, the declarative paradigm and the imperative paradigm of the procedural code. The impedance mismatch represents the two different ways of how the code is executed, and optimization of the imperative procedure is inefficient. Without efficient optimization being performed, the query may not be performed in an optimal way.

BRIEF DESCRIPTION OF THE DRAWINGS

With respect to the discussion to follow and to the drawings, it is stressed that the particulars shown represent examples for purposes of illustrative discussion, and are presented to provide a description of principles and conceptual aspects of the present disclosure. In this regard, no attempt is made to show implementation details beyond what is needed for a fundamental understanding of the present disclosure. The discussion to follow, in conjunction with the drawings, makes apparent to those of skill in the art how embodiments in accordance with the present disclosure may be practiced. Similar or same reference numbers may be used to identify or otherwise refer to similar or same elements in the various drawings and supporting descriptions. In the accompanying drawings:

FIG. 2 depicts an example of a procedure according to some embodiments.

DETAILED DESCRIPTION

Described herein are techniques for a database system. In the following description, for purposes of explanation, numerous examples and specific details are set forth to provide a thorough understanding of some embodiments. Some embodiments as defined by the claims may include some or all the features in these examples alone or in combination with other features described below, and may further include modifications and equivalents of the features and concepts described herein.

A query optimizer may optimize a procedure that is received for accessing data in a database. For example, the query optimizer may move operators from one statement to another statement in the procedure. In some examples, a relational operator, such as a filter operator, join operator, etc., may be moved from a loop variant query to another query outside the loop, which can improve the performance of the procedure significantly. For example, the operator that is moved may not be executed in the loop multiple times, which may improve the performance of the query.

As will be discussed below, a procedure may be configured in a graph that represents the imperative procedure that may include both imperative program and declarative program statements. The query optimizer may analyze the graph to push up or pull down operators across statements in the procedure using optimization techniques.

System Overview

Figure 1:
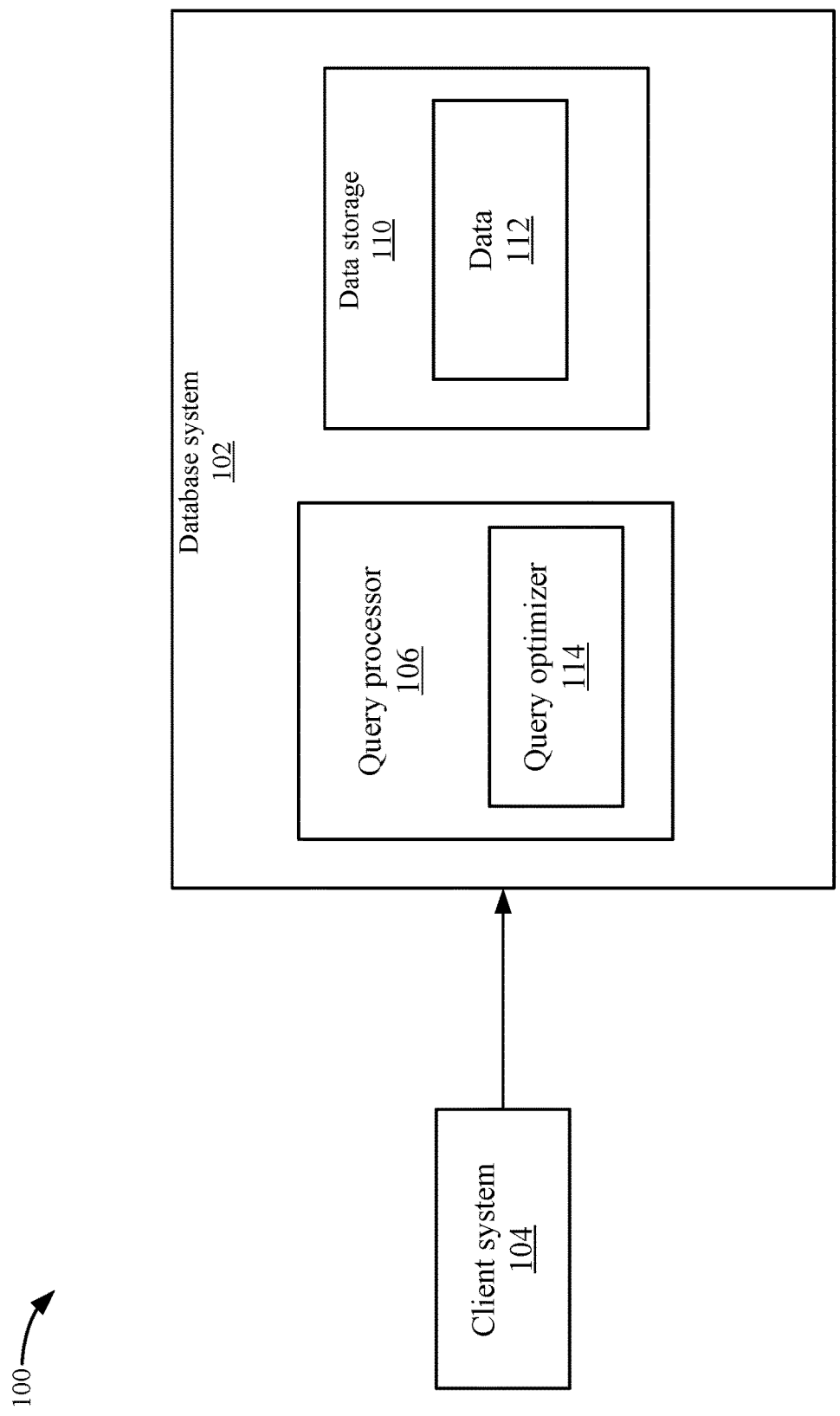
FIG. 1 depicts a simplified example of a system for optimizing procedures according to some embodiments.

FIG. 1 depicts a simplified example of a system 100 for optimizing procedures according to some embodiments. System 100 includes a database system 102 and a client system 104. Client system 104 may include one or more computers that can send queries to database system 102. A query processor 106 may process the query by accessing data 112 that is stored in data storage 110. Data 112 may be data objects that may be any type of data, such as data records, files, tables, etc. Data storage 110 may be any type of storage, such as a database system.

Query processor 106 may receive a query, which may be a procedure that includes software code that is used to determine which data 112 to retrieve from data storage 110. The procedure, which may be referred to as a user-defined function (UDF), may be a program that includes a combination of declarative queries and imperative constructs. The declarative queries may be SQL queries or other declarative queries that focus on what the program should accomplish without specifying how a program should achieve the result. Imperative constructs change a program's state and include expressions that define how to change the state, such as branches, loops, and assignment expressions.

The procedure may include variables, query expressions, loops, branches, and other software code. Variables may be scalar variables and table variables. A scalar variable may hold one value at a time. A table variable may be used when assigning a tabular data structure. A query expression, such as an SQL expression, may be a combination of one or more values, operators and functions that evaluate to a value. The query expressions may include SELECT, UPDATE, INSERT, and DELETE queries. Loops may be formed, such as using while . . . end while loops. Branches may be formed using if-then-else statements. A procedure may return values, such as multiple values, with scalar values or table values.

FIG. 2 depicts an example of a procedure 200 according to some embodiments. The procedure may include units that may be referred to as statements. A statement may express an action and is denoted as s=(v; e; I), where e is an expression, v is a variable for assigning result of e, and I is a set of inputs, such as tables or scalar variables used in e. If e is a query, such as an SQL query, the relational algebraic expression associated with the query is used to express the query and its result is assigned to v. Core relational operators considered in a relational statement may include projection, selection, join, union, and aggregation, but other operators may be used.

At 202, procedure 200 may include statements $S_1$ to $S_{10}$. For example, statement S1 may be "declare sales_cnt integer". Statements $S_2$, $S_5$, $S_7$, and $S_9$ may be SQL assignment statements. Statement $S_3$ may be a "select" relational statement, and statements $S_4$, $S_6$ and $S_8$ are part of an if-then-else loop.

Query optimizer 114 may generate a statement graph for procedure 200. To generate the statement graph, query optimizer 114 may use a control flow graph and a data flow dependency graph. For example, a control flow graph may represent the execution plan of procedure 200. The graph may represent all possible traversal paths during the execution of procedure 200. The statement graph may be represented as G(V,E), where V is a set of nodes representing the basic blocks, which are a straight line sequence of statements, and E is the set of edges that represents the control flow between a pair of basic blocks.

To represent the data flow dependency, query optimizer 114 may use a data dependency graph, which may be a directed acyclic graph. An acyclic graph is a graph that does not have graph cycles, and may be a tree. A data dependence graph may be denoted as DDG=(N,E), where a node n∈N represents a statement, a table, or an input parameter, and an edge e∈E represents data or the control dependency between two connected nodes. The direction of an edge represents the data dependency direction. The label of an edge represents the type of data or control dependency.

Query optimizer 114 may use the control flow graph and the data dependency graph to define statements that are referred to as producer statements and consumer statements depending on the dependencies between statements. A producer statement may produce a variable to a consumer statement, and a consumer statement may consume a variable from a producer. For example, given two statements $s_1=(v_1, e_1, I_1)$ and $s_2=(v_2, e_2, I_2)$, if variable $v_2$ exists in input $I_1$, statement $s_1$ is referred to as a consumer of variable $v_2$ and statement $s_2$ is referred to as a producer of variable $v_2$. Query optimizer 114 produces a statement graph that represents a relationship between producers and consumers that are determined from the control flow graph and the data dependency graph. An example of a producer statement is "$v_0$=select name, id from $table_1$ where d_year>2016" and an example of a consumer statement is "$v_1$=select name from $table_2$, :$v_0$ where d_year=2019". The producer statement provides the variable $v_0$ and the consumer statement uses the variable $v_0$.

Figure 3:
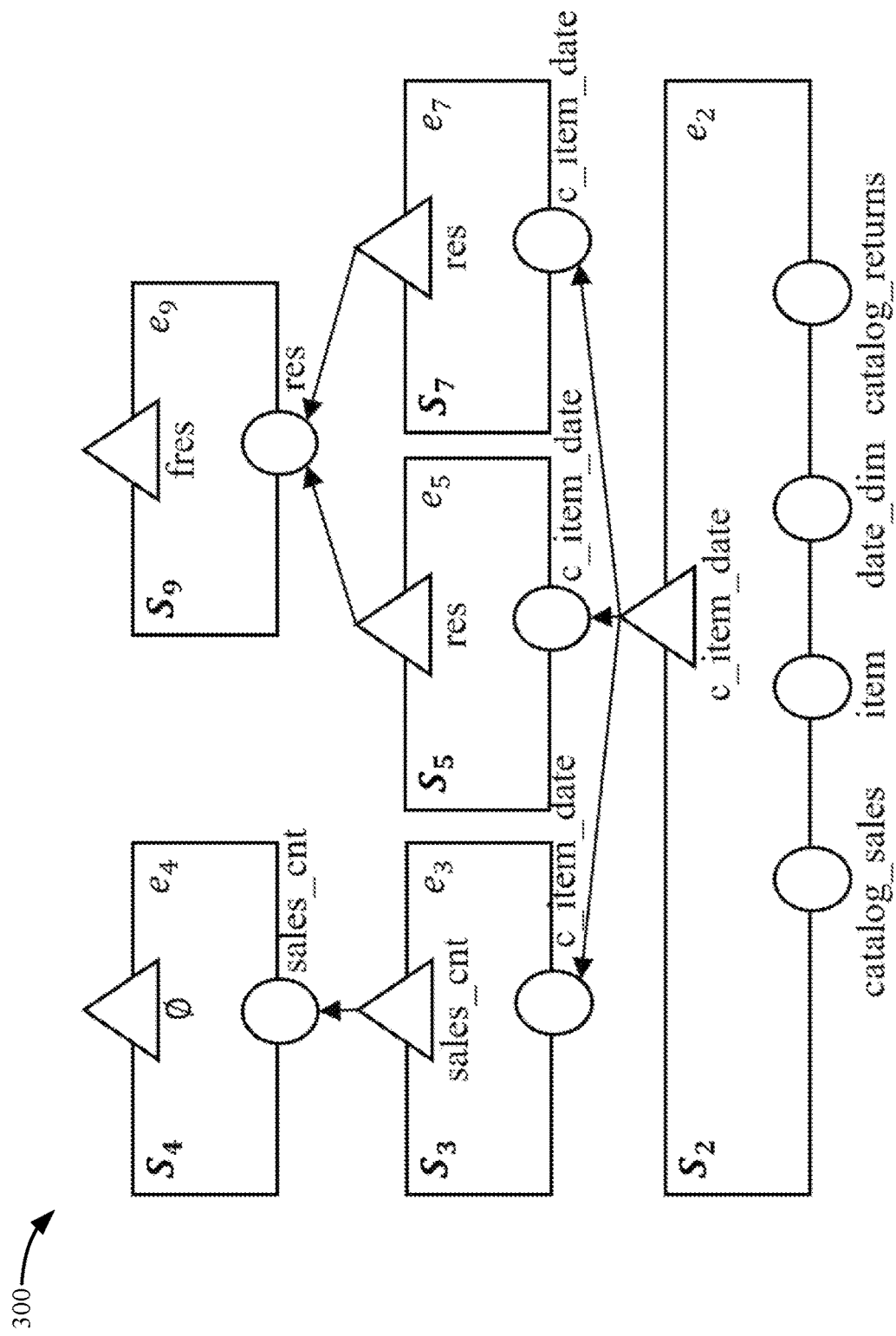
FIG. 3 depicts an example of a statement graph according to some embodiments.

A statement graph G(V,E) may be constructed, where V is a set of nodes representing the producers and consumers and E is the set of edges. Each edge (p, c) represents a connection between a producer statement p and a consumer statement c, where p produces a variable v and c consumes that variable. The statements may be determined from the control flow graph based on the execution path of the procedure. The statements may be identified as producer statements and consumer statements from the data dependency graph based on the direction of the flow of data, such as if the data flows from node A to node B, node A is a producer and node B is a consumer. FIG. 3 depicts an example of a statement graph 300 according to some embodiments. Each rectangle in statement graph 300 represents a statement from procedure 200 of FIG. 2, such as statements $S_2$, $S_3$, $S_4$, $S_5$, $S_7$, and $S_9$. If a statement from procedure 200 is not shown, then that statement may not be a producer or consumer. Each statement may include an expression "e". The triangles show the produced variables from producer statements, such as statement $S_2$ produces the variable c_item_date, statement $S_3$ produces the variable sales_cnt, statement $S_4$ does not produce a variable (represented as null 0), statement $S_5$ produces the variable res, statement $S_7$ produces the variable res, and statement $S_9$ produces the variable fres. The variables for the producer statements are determined based on the code of procedure 200. For example, statement $S_2$ in procedure 200 includes the variable c_item_date that returns a value based on the provided query expressions. A statement may not be connected to a consumer if the variable is not consumed, such as in statements $S_4$ and $S_9$. The circles in statement graph 300 represent the variables that are consumed by the consumers, such as statements $S_3$, $S_5$, and $S_7$ consume variable c_item_date. The data flow graph may be used to determine which way the data flows. For example, the data flow from producer statements to consumer statements is shown via arrows from the producer statements to the consumer statements.

Figure 4:
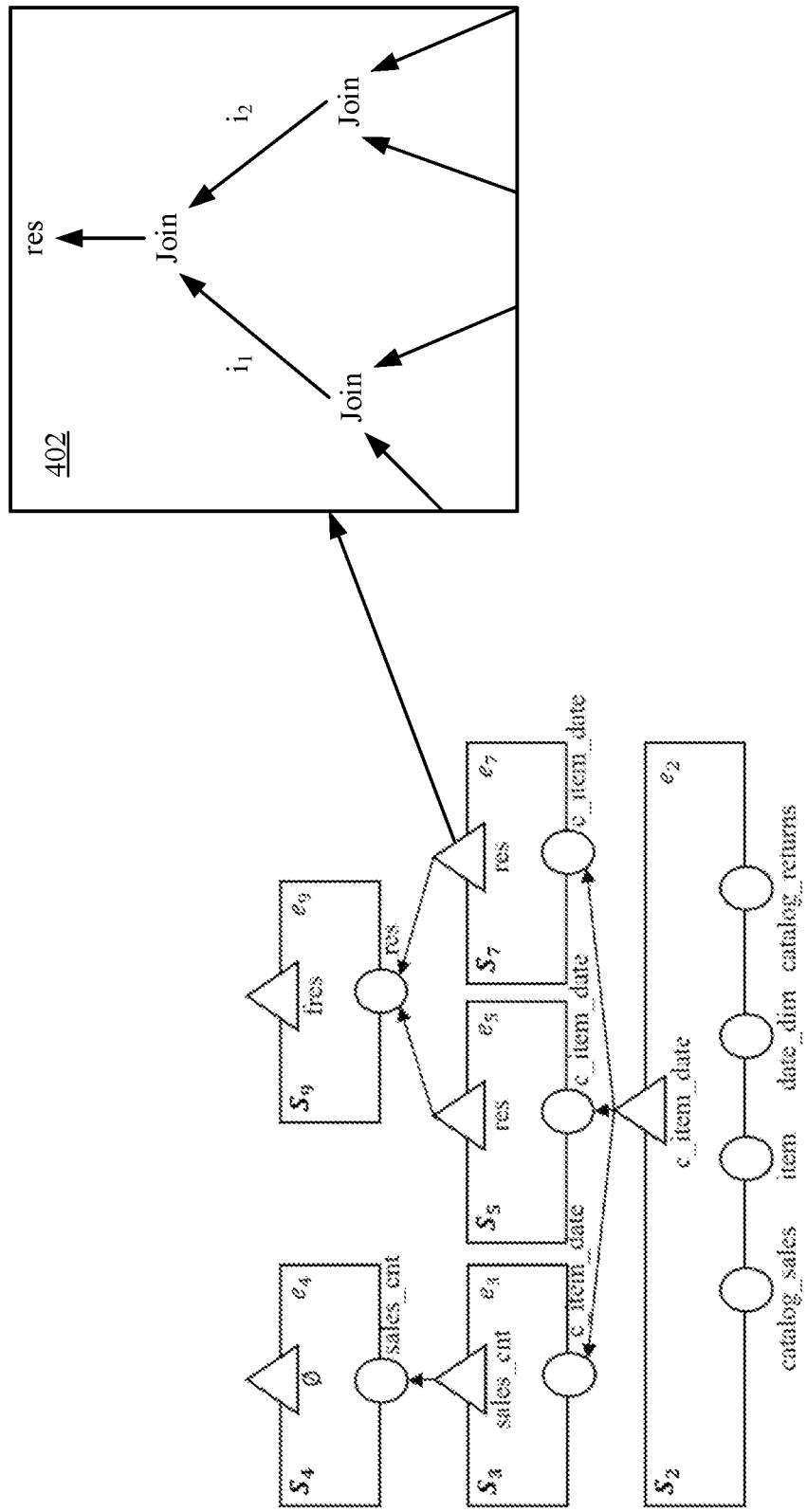
FIG. 4 depicts an example of a query tree for a statement according to some embodiments.

The statements may be represented by query trees. FIG. 4 depicts an example of a query tree for a statement according to some embodiments. At 402, a query tree is shown that may is part of an expression $e_7$ in statement $S_7$. If the expression of each statement is represented by query trees, then, the root of the query tree for v in a producer statement is equivalent to one of the leaf nodes of the query tree in the consumer of v. As shown at 402, inputs $i_1$ and $i_2$ are input into a join statement for statement $S_7$. The root of the query tree outputs the variable res in statement $S_7$. Then, a leaf node of a query tree in statement $S_9$ (not shown) receives the variable res.

Once generating the statement graph, query optimizer 114 may optimize the procedure using the statement graph.

Procedure Optimization

Figure 5:
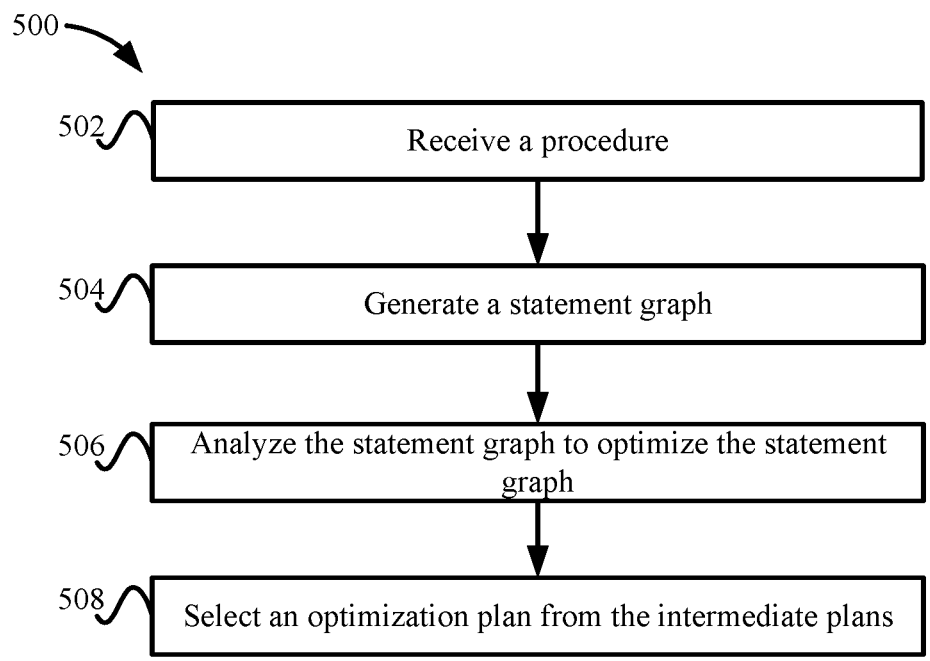
FIG. 5 depicts a simplified flowchart of a method for optimizing a procedure according to some embodiments.

FIG. 5 depicts a simplified flowchart 500 of a method for optimizing a procedure 200 according to some embodiments. At 502, query optimizer 114 receives a procedure

200. The procedure may include software code that is configured to be executed to retrieve data 112 from data storage 110.

At 504, query optimizer 114 may generate a statement graph. The statement graph may be generated based on a control flow graph and data dependency graph that are generated from the statements of the procedure.

At 506, query optimizer 114 analyzes the statement graph to optimize the statement graph, which generates an optimization plan for the procedure. For example, query optimizer 114 may apply a set of optimization rules to pull up operators from producers to consumers and push down operators from consumers to producers. Query optimizer 114 may iteratively pull up and push down the operators based on a set of rules. Each iteration may produce an intermediate optimization plan in the form of a statement graph. For example, as operators are pulled up or pushed down, the query trees of the statement graph may be altered. This process will be described in more detail below.

At 508, once all the iterations from all the set of rules are completed, query optimizer 114 outputs an optimization plan from the iterations. Upon the output of the optimization plan, query processor 106 may execute the procedure based on the optimization plan. For example, some operators may have been moved across statements in the procedure. Query processor 106 may then execute the procedure with the moved operators. The execution of the optimized procedure may improve the retrieval of data 112 because the retrieval may be more efficient, such as less expressions may be executed. The following will now discuss the optimization in more detail.

Operator Movement

One example of an optimization that is performed by query optimizer 114 may be inter-statement optimization. The inter-statement optimization may move operators across the producer statements and the consumer statements, such as between multiple query trees. In procedure 200 in FIG. 2, inter-statement optimization may optimize procedure by pushing down the filter statement "i_category='Jewelry'". The statement filter statement "i_category='Jewelry'" may be executed selectively. For example, statements $S_5$ and $S_7$ are conditionally executed according to the evaluated result of statement $S_4$. In this case, the filter statement may be pushed down to statements $S_5$ and $S_7$ from statement $S_9$. Then, the filter statement may be further pushed down to statement $S_2$ from statement $S_3$, statement $S_5$, and statement $S_7$ because the filter statement is now common in those statements. Intra-statement transformations may also be performed, such as transforming operators in a single query tree. However, the intra-statement transformations are performed to enable inter-statement transformations to be performed as will be described below in FIGS. 6A-6C.

Pulling up or pushing down an operator from one query tree to another may be triggered by different scenarios. For example, some operators cannot be moved to another query tree even after considering all possible transformation rules. In some cases, query optimizer 114 may evaluate in advance that moving some operators may produce an inefficient optimization plan. Moving an operator without considering the data dependency can produce an invalid result if that operator is related to multiple producers and consumers. To determine the operators that can be moved from one query to another considering the integrity of the result as well as the benefit of the transformation, query optimizer 114 may define pullable operators, pushable operators, sibling producers, and sibling consumers. A pullable operator may be an operator (op) that may be pulled from a producer to a consumer. A definition of a pullable operator may be if P is a producer statement, and T is a relational tree for the query in P, let op be a node in tree T that represents a relational operator. Query optimizer 114 defines operator op as a pullable operator if and only if operator op is either the root node of tree T or operator op is replaced as the root node of tree T after applying the transformation rules that are related to operator op.

A pushable operator may be an operator that is pushed down from a consumer C to a producer. In some embodiments, a pushable operator may be defined by letting consumer C be a consumer statement, tree T be a relational tree for the query in consumer C, and V be the set of nodes in T that represent table variables. If operator op is a node in tree T that represents a relational operator, query optimizer 114 defines operator op as a pushable operator if and only if operator op is either the parent of a node $v \in V$ or operator op is replaced as the parent of $v \in V$ in tree T after applying the transformation rules that are related to operator op.

Figure 6A:
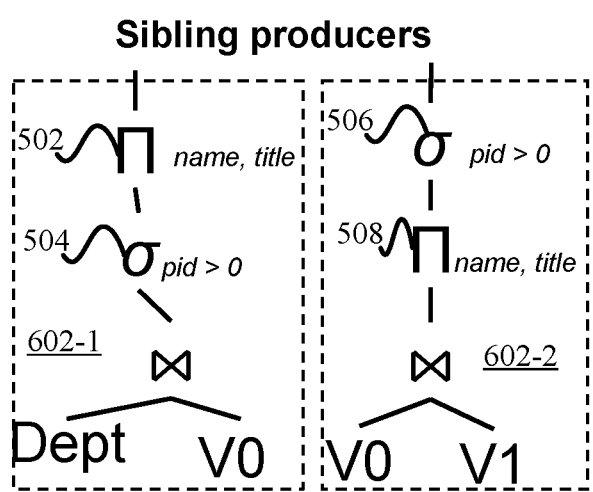
FIG. 6A depicts an example of sibling producers according to some embodiments.
Figure 6B:
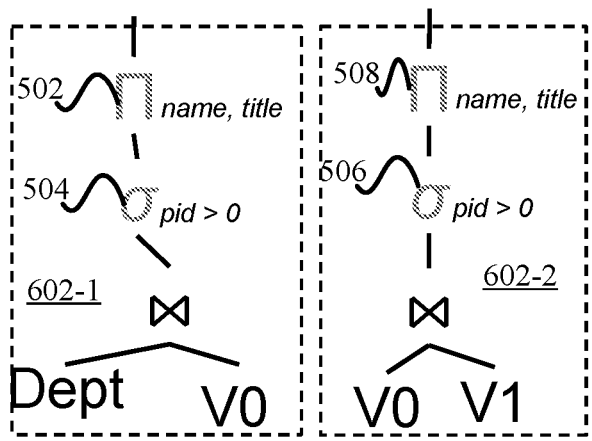
FIGS. 6B and 6C show examples of pullable expressions that can be created using intra-transformations according to some embodiments.
Figure 6C:
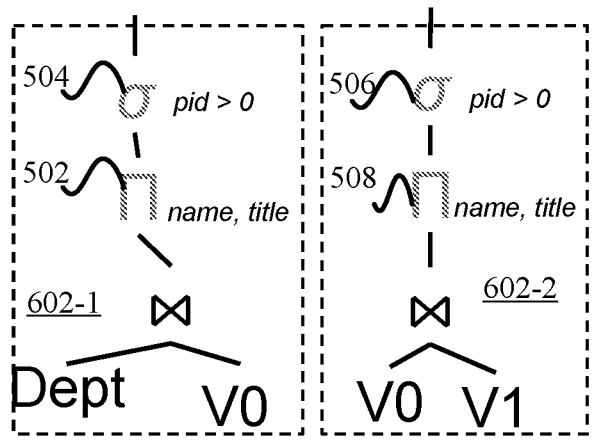

Sibling producers are a set of statements that produce a same variable v. Sibling consumers are a set of statements that consume the same variable v. In the procedure in FIG. 2, statements $S_5$ and $S_7$ are sibling producers because both produce the same variable res. Also, statements $S_3$, $S_5$, and $S_7$ are sibling consumers because all of them consume the same variable c_item_date. Sibling producers are shown in FIG. 6A and pullable expressions in sibling producers are shown in FIGS. 6B and 6C. A pullable operator may be pullable if it is commonly found in siblings at the root of a query tree. First, query optimizer 114 may select pullable operators or pushable operators from a query tree without transforming the query tree. However, the query tree may not include pullable operators or pushable operators, but may be transformed to include pullable operators or pushable operators (via an intra-statement transformation).

Given a statement graph and a set of rules R, query optimizer 114 may perform two types of transformations, inter-statement transformations and intra-statement transformations. Inter-statement transformations may pull up or push down operators to another statement. Intra-statement transformations may optimize operators in a single query tree. FIG. 6A depicts an example of sibling producers according to some embodiments. A first sibling producer 602-1 and a second sibling producer 602-2 are shown. Sibling producers 602 include operators organized in a query tree. For example, sibling producer 602-1 includes a projection operator at 502 and a selection operator at 504 at the root of the query tree. Sibling producer 602-2 includes a selection operator at 506 and a projection operator at 508.

The operators in sibling producers 602-1 and 602-2 may not be pullable in this case because the projection operator at 502 and the selection operator at 506 are not the same operator that is produced to the consumer. However, query optimizer 114 may perform transformations to transform the query tree to make pullable operators or pushable operators available. Intra-statement transformation may find a pullable or pushable operator, find common pullable or pushable sub-expressions in siblings, and/or find the set of operators to pull/push.

FIGS. 6B and 6C show examples of pullable expressions that can be created using intra-transformations according to some embodiments. In FIG. 6B, the selection expression at 506 and the projection expression at 508 may be swapped to create a pullable expression. Here, the projection expression at 502 and the projection operator at 508 may now be common in both query trees in sibling producers 602-1 and 602-2, and can be pulled to another statement.

In FIG. 6C, projection operator at 502 and selection operator at 504 are switched. Selection operator at 504 and selection operator at 506 are now common pullable operators for sibling pullable expressions 602-1 and 602-2, and can be pulled to another statement. Other intra-statement transformations may also be performed, such as to transform query trees in consumer statement to form pushable expressions in sibling consumers. For example, the join statement is the parent of the variables Dept and VO, and can be a pushable expression.

Query optimizer 114 may use a set of optimization rules to optimize the statement graph. An optimization rule may represent one or more optimization rules for a specific operator, such as the select operator. Each operator may have its own set of optimization rules. However, when selecting the pullable operators or pushable operators from a given query tree, query optimizer 114 may consider the same types of operators, such as a filter operator, with different predicates to be different operators. A predicate may act as a filter that filters a certain number of rows from a row set. That is, a predicate may be a condition.

In the optimization for an optimization rule, query optimizer 114 may analyze a query tree to determine pullable operators without transforming the query tree. Then, query optimizer 114 may attempt to transform the expressions of query tree by transforming operators in statements, such as by swapping operators to form additional pullable operators. The set of pullable operators may be derived from the operators without transforming the query tree and pullable operators that are found by transforming the query tree using intra-statement transformations.

The generation of pushable operators may also be performed in the same way by determining pushable operators without changing the query tree and performing intra-statement transformations to determine any further pushable operators.

Figure 7:
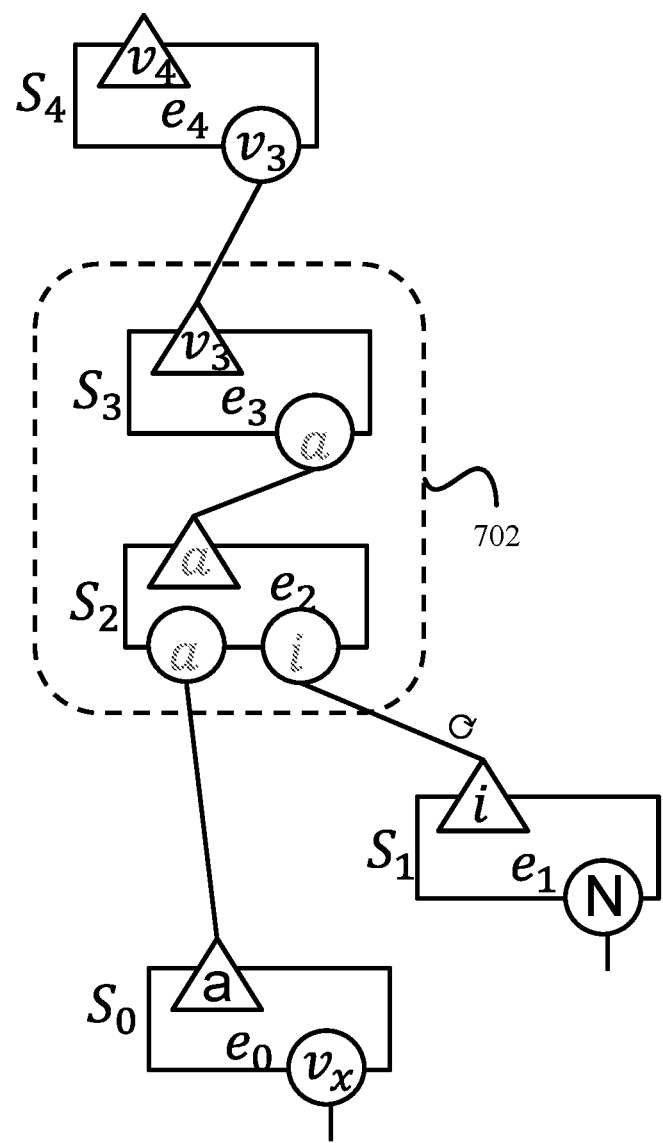
FIG. 7 depicts an example of flow dependency according to some embodiments.

In an inter-statement transformation, query optimizer 114 may move an operator from one query tree in a statement to another query tree in a statement, but the movement may result in scenarios that may be undesirable. Query optimizer 114 may perform safety checks to determine if changes have occurred that may affect the safety of the execution. One example of a check is related to flow dependency. FIG. 7 depicts an example of flow dependency according to some embodiments. A flow variant variable may be a variable v that is produced by the statements $S_0$ and $S_1$. If statement $S_1$ and statement $S_2$ are two consumers of the variable v, the variable v is a flow variant variable if, and only if, statement $S_1$ updates the value of variable v before being consumed by statement $S_2$. This may be related to read after write dependent statements. If a flow variant variable exists in a predicate or is an operand of any operator, then that predicate or operator cannot be pulled up or pushed down. For example, the following procedure may be represented by FIG. 7:

$S_0: a = v_x$ $S_1$: FOR $i=0; i<N; i++$ $S_2: a = a+i$ $S_3: v_3 =$ SELECT*FROM $v_0$ WHERE (count %$a$)=0 AND (count %$i$)=0 AND $op_x$ $S_4: v_4 =$ SELECT*FROM $v_3$ The procedure includes statements $S_0$ to $S_4$. The variables "i" and "a" are flow variant variables because the value of "i" and "a" are being updated and consumed by another statement in each iteration of the procedure where the loop is shown at 702 in FIG. 7. For example, statement $S_2$ is updating the variable "a" and statement $S_1$ is updating the variable "i", statement $S_2$ consumes the variable "a" and "i", and statement $S_3$ consumes the variable "a". An operator can be considered for being pulled up or pushed down if it does not contain a flow variant variable. In this case, the operators associated with the variable "a" cannot be pulled up or pushed down. However, the operator $op_x$ may be considered for a pull up or push down if it does not contain a flow variant variable. However, an operator may be pushed down if the statement consumes a variable produced by a statement outside of the loop or an operator can be pulled up from a statement if that statement has a consumer outside of the loop.

Figure 8:
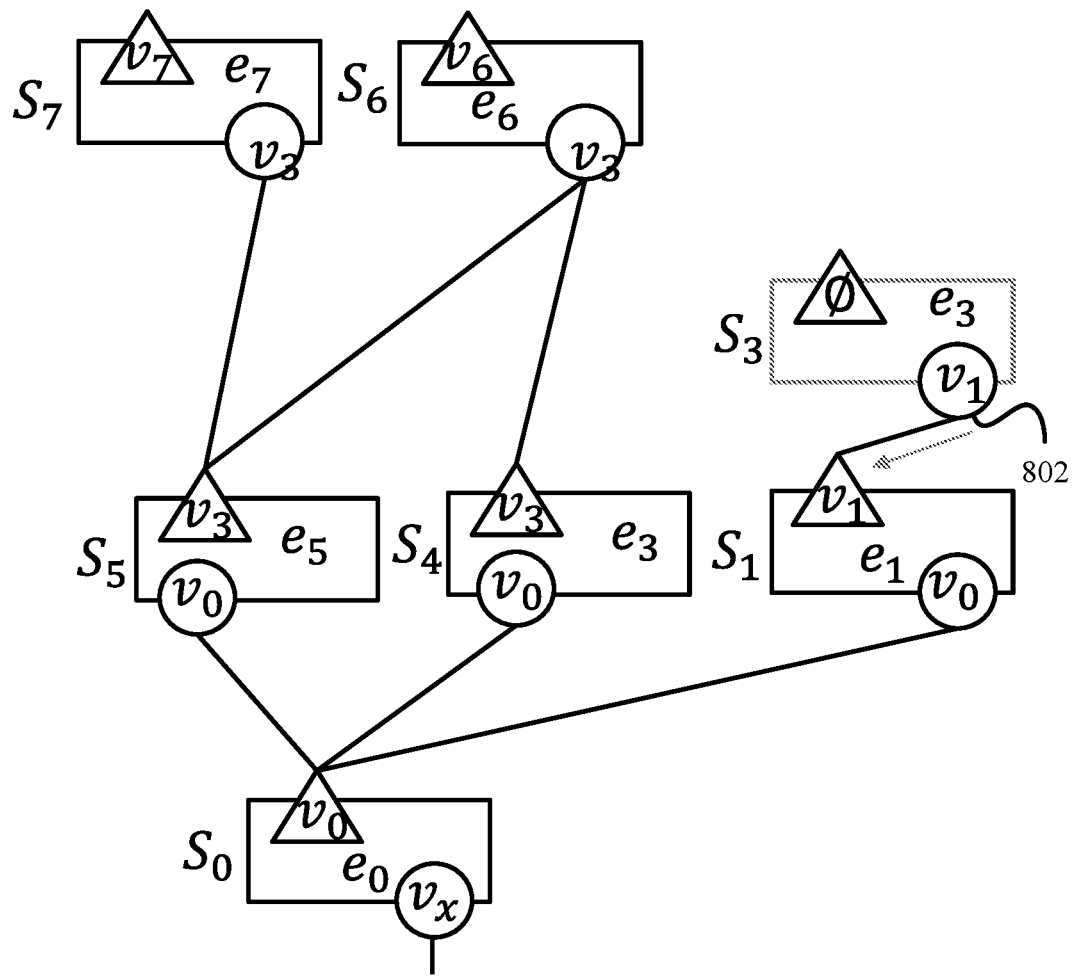
FIG. 8 depicts an example of a transformation that is blocked according to some embodiments.

Query optimizer 114 may also perform a safety check during a transformation according to some embodiments. Moving operators from one statement to another can sometimes create control flow hazards. A branch head or loop head statement in the control flow graph directs the flow of execution, which consumes data from other statements. The motion of an operator updates the link for the statement graph that represents the predicate of a branch head or loop head, and the updated link can affect the control flow in the control flow graph. Accordingly, query optimizer 114 blocks any inter-statement transformation that causes a link update to a branch head or a loop head statement. Also, query optimizer 114 may prohibit any inter-statement transformation that a branch and a loop head statement becomes empty after the transformation. FIG. 8 depicts an example of a transformation that is blocked according to some embodiments. If the operator at 802 is moved from statement $S_3$ to statement $S_1$, the branch head or loop head may become empty. Accordingly, query optimizer 114 may block this transformation.

Figure 9:
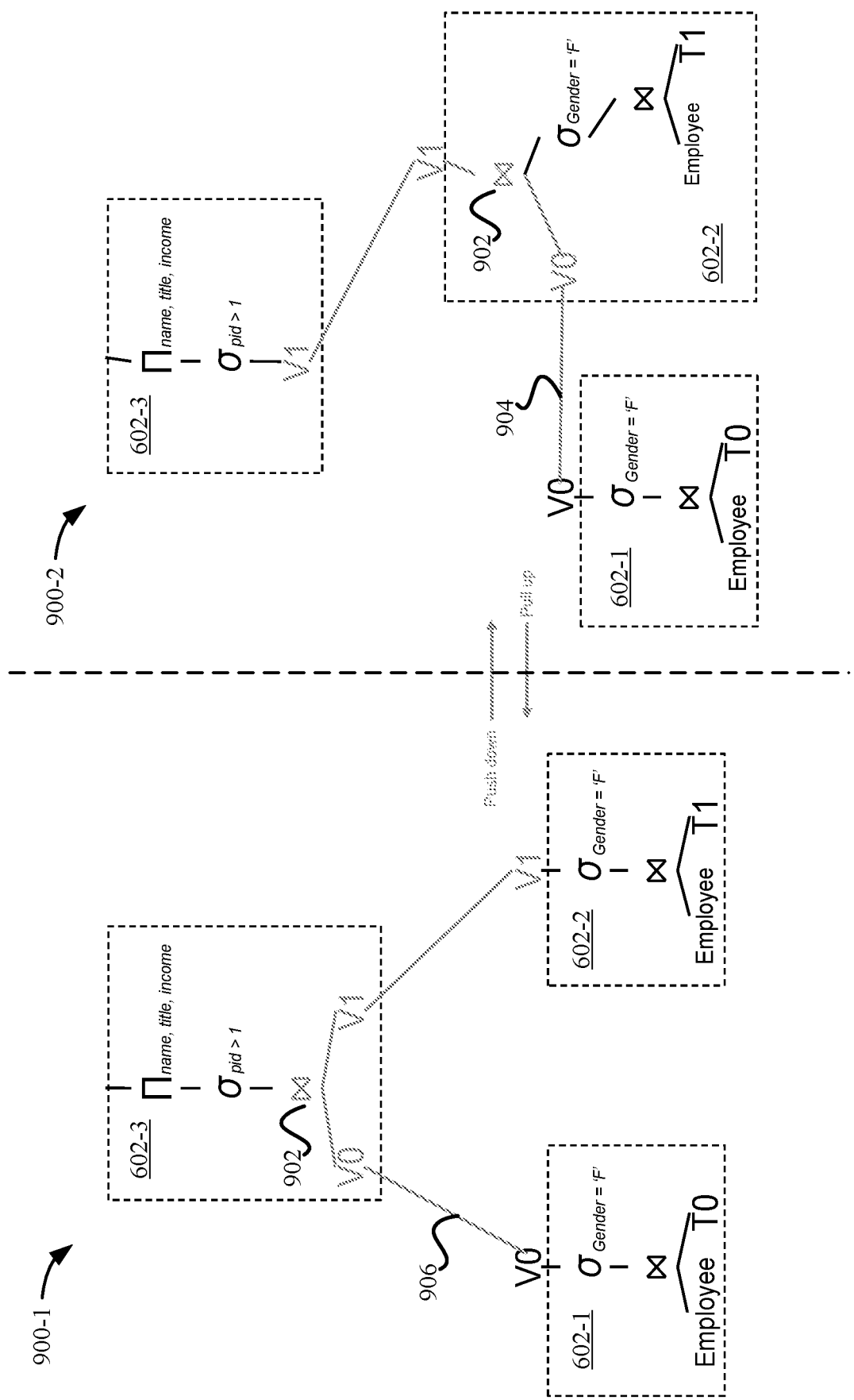
FIG. 9 depicts examples of pushing down or pulling up operators that trigger a link update that may be allowed in the optimization according to some embodiments.

The following is a transformation that is allowed where pushing down or pulling up of operators may trigger a link update. FIG. 9 depicts examples of pushing down or pulling up operators that trigger a link update that may be allowed in the optimization according to some embodiments. A join operator at 902 in FIG. 9 may be moved. A before and after may be shown for either the push down or the pull up of the operator. For example, a statement graph at 900-1 and a statement graph at 900-2 are shown. If the statement graph at 900-1 is taken as the original statement graph, and the join operator at 902 is pushed down, a link update may occur. For example, in statement graph 900-1, the join operator in a statement 602-3 is shown at 902. Statement 602-3 may consume variable V0 from statement 602-1 and variable V1 from statement 602-2. If the join statement is moved from statement 602-3 to statement 602-2, the statement graph at 900-2 results. As can be seen, the join operator at 902 is now found in statement 602-2 in statement graph 900-2. This, however, triggers a link update between the statements. For example, instead of statement 602-1 being connected to statement 602-3, a link update is performed to connect statement 602-1 to statement 602-2. Because the join operator joined the variables V0 and V1, the producer of variable V0 should be now consumed by the join in statement 602-2 and the link is updated at 904 to be between statement 602-1 and statement 602-2. The link from statement 602-2 to 602-3 still provides the variable V1, which is a same result of the join of the selection of Gender='F'.

If the statement graph in 900-2 is the original statement graph, and if the join statement at 902 in statement 602-2 is pulled up to statement 602-3, the statement graph at 900-1 results. Here, a link update occurs in the reverse by changing the link from statement 602-1 to statement 602-2 at 904 to a link from statement 602-1 to statement 602-3 at 906. This link update occurs because the join statement is now in statement 602-3 and joins the variables V0 and V1.

Optimization Process

Figure 10:
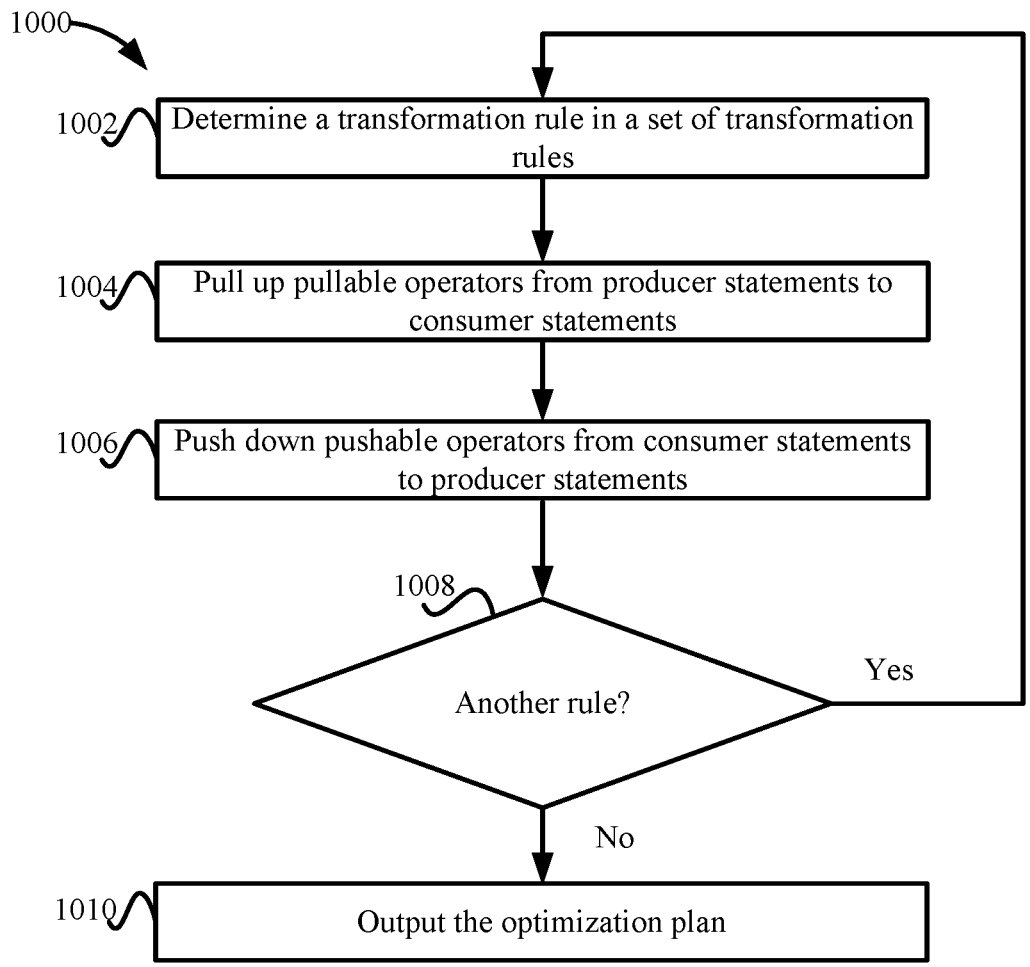
FIG. 10 depicts a simplified flowchart of a method for performing the optimization process according to some embodiments.

FIG. 10 depicts a simplified flowchart 1000 of a method for performing the optimization process according to some embodiments. Different processes may be used to determine which operators to push down or pull up across the statements to optimize the statement graph. Query optimizer 114 may traverse the statement graph during the optimization to pull up and push down operators across statements. At 1002, query optimizer 114 determines a transformation rule in a set of transformation rules. Each transformation rule in the set may include a set of sub-rules (one or more sub-rules, two or more sub-rules, etc.) that can be applied. A transformation rule may be associated with an operator, such as a filter operator or a projection operator. In this case, filter operators may be pulled up or pushed down in a first rule and projection operators may be pulled up or pushed down in a second rule.

Then, query optimizer 114 optimizes the statement graph. In some embodiments, query optimizer 114 may treat the query trees in the statements of a statement graph as being connected, where the root operator of a query tree in a producer produces data for a leaf node of a query tree in a consumer. Query optimizer 114 may transform the query in each statement. Then, query optimizer 114 moves the pullable or pushable operators to another statement so that the optimization can be performed in the destination query tree. Note that this approach imitates an optimization that treats the entire statement graph as if it represents a single query.

In some embodiments, at 1004, query optimizer 114 pulls up pullable operators from producer statements to consumer statements. To find and pull up the pullable operators from the producer statements to the consumer statements, query optimizer 114 may visit the statements in the statement graph to select operators that can be pulled up. As will be described later in FIG. 11, the post-order traversal approach may be used which may start at the first producer statement at the bottom of the graph. During the post-order traversal approach, query optimizer 114 pulls up the associated pullable operators inter-statement from each producer until operators cannot be pulled up further in the statement graph. This will be described in more detail in FIG. 11. In some embodiments, query optimizer 114 first evaluates a queue Q, which preserves the sequence of the post order traversal of the statement graph. Query optimizer 114 removes a statement s from queue Q and checks if statement s has any consumers. Note that a statement may not have a consumer if it is an exit statement (e.g., statement $s_6$ or statement $s_7$ in FIG. 2) or has a branch or loop control flow dependency (e.g., statement s3 in FIG. 2). If statement s does not have a consumer then there is nothing to pull up from statement s. However, if statement s does have one or more consumers, then query optimizer 114 retrieves the produced variable of v and then finds all sibling consumers C and producers P of variable v from the statement graph. Query optimizer 114 identifies the producer-consumer pattern pt among producer P and consumer C. Then, query optimizer 114 finds the pullable operators PO from the query tree for statement s if pattern pt is single producer and single consumer (SPSC) or single producer and multiple consumers (SPMC). The single producer and single consumer produces a variable between a single producer and a single consumer. The single producer and multiple consumers produces a variable between a single producer and multiple consumers. However, if pattern pt is multiple producer and single consumer (MPSC) or multiple producer and multiple consumer (MPMC), then query optimizer 114 evaluates the common pullable operators PO across all producers P. The multiple producers and single consumer produces a variable between multiple producers and a single consumer. The multiple producers and multiple consumers produces a variable between multiple producers and multiple consumers. After evaluating pullable operators PO, query optimizer 114 pulls up the operators in PO from producers P to consumers C and updates the statement graph. Then, query optimizer 114 considers all producers in producers P to remove them from queue Q to avoid any redundant computations. When all statements in queue Q are considered, query optimizer 114 returns the updated statement graph.

At 1006, query optimizer 114 pushes down pushable operators from consumer statements to producer statements. Query optimizer 114 may visit the statements in the statement graph using a different traversal approach, such as a level order traversal. In this case, the traversal may start at the topmost consumer statement of the graph. This will be described in more detail in FIG. 12. Query optimizer 114 pushes down the associated pushable operators from each consumer until pushable operators cannot be pushed down further. In some embodiments, query optimizer 114 first evaluates a queue Q, which represents the sequence of level order traversals of the statement graph. Then, query optimizer 114 iterates for each statement s E Q to mimic the level order traversals of the statements in the statement graph. A consumer statement can consume one or more variables. Query optimizer 114 identifies all the variables V that are consumed by statement s. With respect to each v∈V, query optimizer 114 identifies the sibling consumers, sibling producers, and the producer-consumer pattern pt. Based on the type of pattern p, query optimizer 114 identifies the pushable or common pushable operators PO with respect to the variable v. After obtaining the pushable operators with respect to the variable v, query optimizer 114 marks variable v as a visited variable. Then, if query optimizer 114 finds that a consumer contains only visited variables, query optimizer 114 removes that consumer from queue Q to avoid any redundant computations. After evaluating the pushable operators PO, query optimizer 114 pushes down the operators in pushable operators PO from consumers C to producers P and update the statement graph. Finally, when all statements in queue Q are visited, query optimizer 114 returns the updated statement graph. The cost of performing the optimization may be reduced because a statement for each produced or consumed variable is only visited once.

In one example, query optimizer 114 may consider that the query trees in statements of a statement graph are connected, where the root operator of a query tree in a producer statement produces data for the leaf node of the query tree in a consumer. Query optimizer 114 transforms the query in each statement by pulling up or pushing down operators. That is, query optimizer 114 may move the pullable operator or pushable operator to another statement so that the optimization can be performed in the destination query tree.

The optimization for a rule may alter a statement graph to form an intermediate optimization plan. Each rule may iteratively alter the statement graph. For example, a rule r1 may alter and output an intermediate plan for the statement graph. Then, a rule r2 may receive the altered statement graph, and apply its rules to the altered statement graph. An example of a rule r1 may be to perform an optimization for a filter operator. Then, a rule r2 may perform an optimization for a projection operator. A rule that is applied may not alter the statement graph if no operators meet the requirements. In this case, the same statement graph is used for the next rule. Accordingly, after performing the optimization for the rule, at 1008, query optimizer 114 determines if another rule exists. If so, the process reiterates to 1002 to apply the transformation rule to the procedure again. The process continues until all transformation rules have been processed.

At 1010, query optimizer 114 outputs the optimization plan based on iterations of intermediate optimization plans. The outputted optimization plan may provide an altered statement graph based on the applied rules. The altered statement graph may be used to generate an optimized procedure. For example, the procedure may be generated from the optimized statement graph. In some examples, operators that are moved in the statement graph are moved in the procedure based on how the operators were moved in the statement graph, such as a filter statement that is moved in a query tree in the statement graph is moved in the procedure to reflect the movement. In some embodiments, the above rule set may organize the rules based on a metric, such a value, an importance, cost, benefit, etc. That is, the first rule may be considered to provide a highest value, the second rule provides the second highest value, etc. Other methods to perform the optimization may be appreciated. For example, a cost based method may be used. The selection of an optimization plan may be performed based on measuring a cost of different plans that are generated, and selecting one of the plans that provides the optimal cost that meets a condition, such the plan that has the smallest cost or reduces the cost the most compared to the original procedure.

Figure 11:
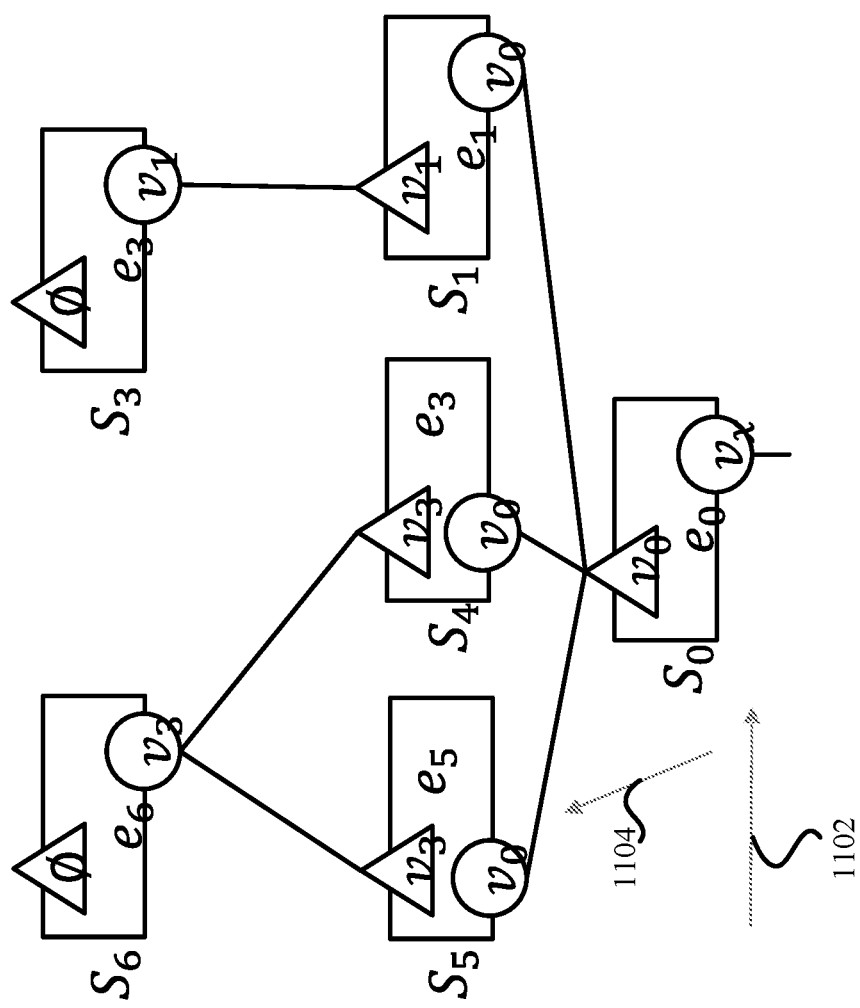
FIG. 11 depicts a traversal order for pulling up operators according to some embodiments.
Figure 12:
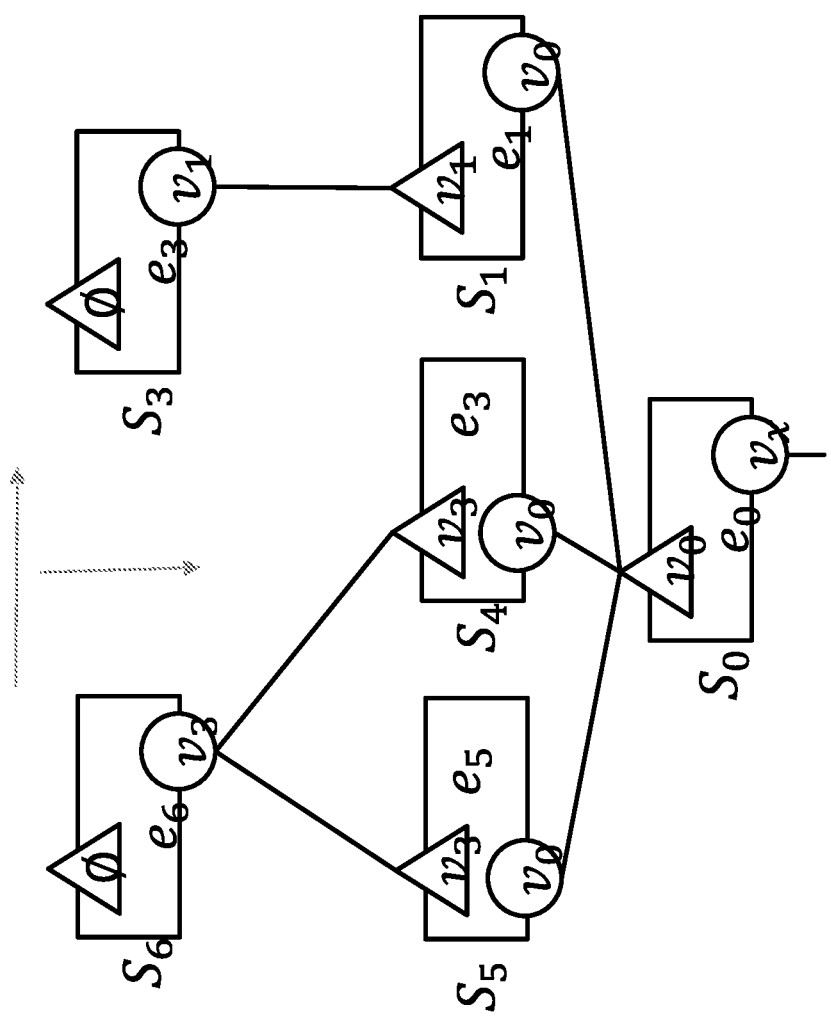
FIG. 12 depicts an example of level order traversal according to some embodiments.

As discussed above, the statement graph may be traversed in an order. FIG. 11 depicts a traversal order for pulling up operators according to some embodiments. The traversal order may traverse from left to right starting from the leaf statements to root statements. In this case, the sequence of nodes to visit may be the sequence of statements $S_0$, $S_5$, $S_4$, $S_1$, $S_6$, and $S_3$. FIG. 12 depicts an example of level order traversal according to some embodiments. In this case, the level order traversal may move from the root statements left to right and down toward the leaf statements. The sequence of statements that are traversed may be statement $S_6$, statement $S_3$, statement $S_5$, statement $S_4$, statement $S_1$, and statement $S_0$.

Another example may consider every common pullable operator to producers is pulled to consumers one after another by considering all transformation rules. All pullable operators are gathered around each other the consumers. The statement graph may be traversed only once for all rules. Siblings and common operators among siblings are discovered only once for all rules. For example, in FIG. 3, while visiting sibling producers, query optimizer 114 needs to access both statement $S_5$ and statement $S_7$ to pull up the common pullable operators to S9. Similarly, while visiting $S_7$, query optimizer 114 needs to visit $S_5$ again to find the common pullable operators. However, query optimizer 114 can remove statement $S_7$ from the search space after visiting statement $S_5$ to avoid the redundant task of finding common pullable operators in statement $S_5$ and statement $S_7$.

The pullable operators in a producer are associated with only a single variable. Therefore, revisiting any producer to pull up associated pullable operators for that variable is redundant. However, a consumer can consume single or multiple variables and, therefore, the pushable operators in a consumer can be associated with multiple variables. Conversely, each consumed variable in a consumer statement is connected to different producers. Therefore, unlike visiting a sibling producer only once, a consumer can be visited once for each consumed variable. Query optimizer 114 denotes a variable v in a consumer as the visited variable after finding the common pushable operators from the sibling consumers of v. Similar to the restriction on traversing all sibling producers, the visited variable helps avoid redundant computations while searching for pushing down operators. While visiting statement S3, query optimizer 114 needs to access statements S3, S5, and S7 to push down the common pushable operators to statement S2. Similarly, while visiting statement S5, query optimizer 114 needs to revisit statements S3 and S7 to find the common pushable operators, which is redundant. However, both the statements S5 and S7 can be removed from the search space after visiting statement S3 because the variable 'c item date' of both S5 and S7 is marked visited after visiting statement S3 and they do not have any variables left to consider for pushing down operators. This improves the process for optimizing the statements by making the process run faster.

CONCLUSION

Accordingly, the procedure optimization moves operators among statements. The movement may improve the processing time of the procedure to access data. Further, a movement of the operator may avoid potential safety problems during execution. The resulting optimization plan may process the procedure more efficiently than other intermediate plans that were determined.

System

Figure 13:
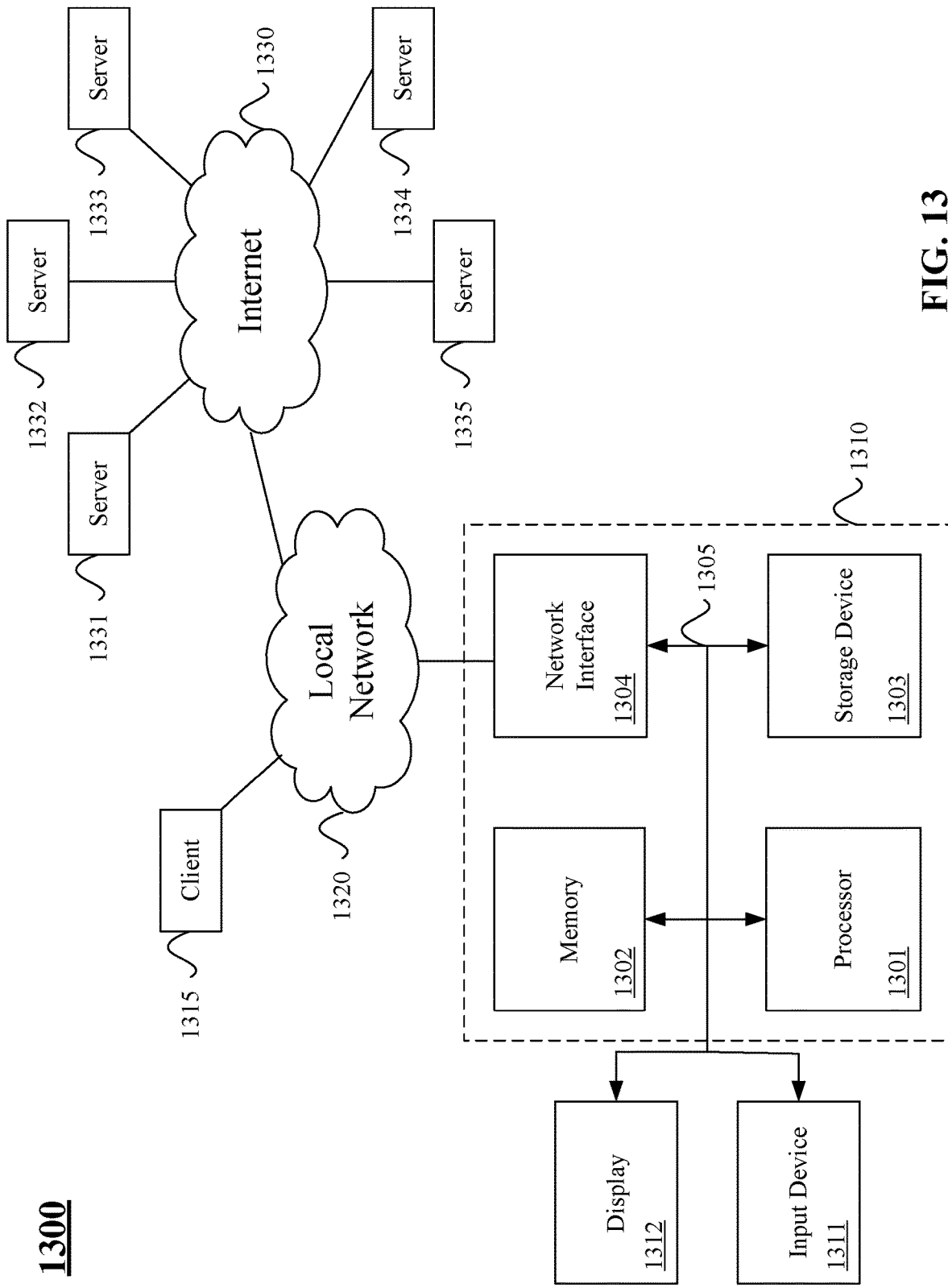
FIG. 13 illustrates an example of special purpose computer systems configured with the database system according to one embodiment.

FIG. 13 illustrates an example of special purpose computer systems 1300 configured with database system 102 according to one embodiment. Computer system 1310 includes a bus 1305 or other communication mechanism for communicating information, and a processor 1301 coupled with bus 1305 for processing information. Computer system 1310 also includes a memory 1302 coupled to bus 1305 for storing information and instructions to be executed by processor 1301, including information and instructions for performing the techniques described above, for example. This memory may also be used for storing variables or other intermediate information during execution of instructions to be executed by processor 1301. Possible implementations of this memory may be, but are not limited to, random access memory (RAM), read only memory (ROM), or both. A storage device 1303 is also provided for storing information and instructions. Common forms of storage devices include, for example, a hard drive, a magnetic disk, an optical disk, a CD-ROM, a DVD, a flash memory, a USB memory card, or any other medium from which a computer can read. Storage device 1303 may include source code, binary code, or software files for performing the techniques above, for example. Storage device and memory are both examples of computer readable mediums.

Computer system 1310 may be coupled via bus 1305 to a display 1312, such as a cathode ray tube (CRT) or liquid crystal display (LCD), for displaying information to a computer user. An input device 1313 such as a keyboard and/or mouse is coupled to bus 1305 for communicating information and command selections from the user to processor 1301. The combination of these components allows the user to communicate with the system. In some systems, bus 1305 may be divided into multiple specialized buses.

Computer system 1310 also includes a network interface 1304 coupled with bus 1305. Network interface 1304 may provide two-way data communication between computer system 1310 and the local network 1320. The network interface 1304 may be a digital subscriber line (DSL) or a modem to provide data communication connection over a telephone line, for example. Another example of the network interface is a local area network (LAN) card to provide a data communication connection to a compatible LAN. Wireless links are another example. In any such implementation, network interface 1304 sends and receives electrical, electromagnetic, or optical signals that carry digital data streams representing various types of information.

Computer system 1310 can send and receive information, including messages or other interface actions, through the network interface 1304 across a local network 1320, an Intranet, or the Internet 1330. For a local network, computer system 1310 may communicate with a plurality of other computer machines, such as servers 1331-1335. Accordingly, computer system 1310 and server computer systems represented by servers 1331-1335 may form a cloud computing network, which may be programmed with processes described herein. In the Internet example, software components or services may reside on multiple different computer systems 1310 or servers 1331-1335 across the network. The processes described above may be implemented on one or more servers, for example. A server 1331-1335 may transmit actions or messages from one component, through Internet 1330, local network 1320, and network interface 1304 to a component on computer system 1310. The software components and processes described above may be implemented on any computer system and send and/or receive information across a network, for example.

EXAMPLE EMBODIMENTS

In some embodiments, a method comprising: receiving, by a computing device, a statement graph for a procedure that is used to access data; determining, by the computing device, a set of producer statements and a set of consumer statements in the statement graph, wherein a producer statement produces a variable for a consumer statement, and the consumer statement consumes the variable from the producer statement; optimizing, by the computing device, the statement graph by moving an operator from a consumer statement to a producer statement or by moving an operator from a producer statement to a consumer statement; and outputting, by the computing device, the optimized procedure based on the optimized statement graph.

In some embodiments, receiving the statement graph comprises: analyzing the procedure to determine statements in the procedure.

In some embodiments, analyzing the procedure comprises: determining a control flow graph for the procedure based on a traversal path of execution from the procedure, wherein the control flow graph is used to generate the statements in the statement graph.

In some embodiments, analyzing the procedure comprises: determining a data flow graph of data through the traversal path, wherein the data flow graph is used to determine whether a statement is a producer statement or a consumer statement.

In some embodiments, a statement in the procedure is defined by s=(v; e; I), where s is a statement, e is an expression, v is a variable for assigning result of e, and I is a set of inputs.

In some embodiments, optimizing the statement graph comprises: moving the operator from the consumer statement to the producer statement; and updating a link between another statement and the consumer statement to point to the producer statement.

In some embodiments, optimizing the statement graph comprises: moving the operator from the producer statement to the consumer statement; and updating a link between another statement and the producer statement to point to the consumer statement.

In some embodiments, optimizing the statement graph comprises: blocking moving the operator from the consumer statement to the producer statement or moving the operator from the producer statement to the consumer statement when a violation of a transformation rule occurs.

In some embodiments, optimizing the statement graph comprises: blocking moving another operator from a consumer statement to a producer statement or moving the another operator from a producer statement to a consumer statement when a variable that is produced by a statement S0 and a statement S1, the variable is consumed by the statement S1 and a statement S2, and the statement S1 updates the value of variable before being consumed by statement S2.

In some embodiments, optimizing the statement graph comprises: blocking another moving of another operator from a consumer statement to a producer statement or another moving the another operator from a producer statement to a consumer statement when the moving of the another operator results in a loop head or branch head being empty.

In some embodiments, optimizing the statement graph comprises: determining a first optimization rule; and moving the operator from the consumer statement to the producer statement or moving the operator from the producer statement to the consumer statement based on the first optimization rule to form a first intermediate plan for the statement graph.

In some embodiments, optimizing the statement graph comprises: determining a second optimization rule; and moving another operator from a consumer statement to a producer statement or moving the another operator from a producer statement to a consumer statement based on the second optimization rule to form a second intermediate plan for the statement graph.

In some embodiments, optimizing the statement graph comprises: performing an optimization of the procedure based on a plurality of optimization rules to alter the statement graph, wherein the statement graph is iteratively optimized by each optimization rule.

In some embodiments, optimizing the statement graph comprises: performing an intra-statement transformation to move an operator within a statement to transform the operator into an operator that can be moved from the consumer statement to the producer statement or from the producer statement to the consumer statement.

In some embodiments, optimizing the statement graph comprises: determining sibling statements that provide a same variable to a consumer statement; and performing an intra-statement transformation to move an operator within one of the sibling statements to make the operator movable from the producer statement to the consumer statement or from the consumer statement to the producer statement.

In some embodiments, a non-transitory computer-readable storage medium having stored thereon computer executable instructions, which when executed by a computing device, cause the computing device to be operable for: receiving a statement graph for a procedure that is used to access data; determining a set of producer statements and a set of consumer statements in the statement graph, wherein a producer statement produces a variable for a consumer statement, and the consumer statement consumes the variable from the producer statement; optimizing the statement graph by moving an operator from a consumer statement to a producer statement or by moving an operator from a producer statement to a consumer statement; and outputting the optimized procedure based on the optimized statement graph.

In some embodiments, optimizing the statement graph comprises: moving the operator from the consumer statement to the producer statement; and updating a link between another statement and the consumer statement to point to the producer statement.

In some embodiments, optimizing the statement graph comprises: blocking moving another operator from a consumer statement to a producer statement or moving the another operator from a producer statement to a consumer statement when a variable that is produced by a statement S0 and a statement S1, the variable is consumed by the statement S1 and a statement S2, and the statement S1 updates the value of variable before being consumed by statement S2.

In some embodiments, optimizing the statement graph comprises: determining a first optimization rule; moving the operator from the consumer statement to the producer statement or moving the operator from the producer statement to the consumer statement based on the first optimization rule to form a first intermediate plan for the statement graph; determining a second optimization rule; and moving another operator from a consumer statement to a producer statement or moving the another operator from a producer statement to a consumer statement based on the second optimization rule to form a second intermediate plan for the statement graph.

In some embodiments, an apparatus comprising: one or more computer processors; and a computer-readable storage medium comprising instructions for controlling the one or more computer processors to be operable for: receiving a statement graph for a procedure that is used to access data; determining a set of producer statements and a set of consumer statements in the statement graph, wherein a producer statement produces a variable for a consumer statement, and the consumer statement consumes the variable from the producer statement; optimizing the statement graph by moving an operator from a consumer statement to a producer statement or by moving an operator from a producer statement to a consumer statement; and outputting the optimized procedure based on the optimized statement graph.

Some embodiments may be implemented in a non-transitory computer-readable storage medium for use by or in connection with the instruction execution system, apparatus, system, or machine. The computer-readable storage medium contains instructions for controlling a computer system to perform a method described by some embodiments. The computer system may include one or more computing devices. The instructions, when executed by one or more computer processors, may be configured to perform that which is described in some embodiments.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of some embodiments may be implemented. The above examples and embodiments should not be deemed to be the only embodiments, and are presented to illustrate the flexibility and advantages of some embodiments as defined by the following claims. Based on the above disclosure and the following claims, other arrangements, embodiments, implementations, and equivalents may be employed without departing from the scope hereof as defined by the claims.

What is claimed is:

1. A method comprising:
receiving, by a query processor operating on a computing device, a query to retrieve data from a database, the query comprising software code including a procedure to determine which data to retrieve from the database, wherein the procedure comprises a plurality of statements;
generating, by the query processor operating on the computing device, a control flow graph and a data dependency graph, wherein the control flow graph represents an execution plan for the procedure and the data dependency graph is a directed acyclic graph comprising nodes and edges, wherein the nodes represent one or more of statements, tables, or input parameters and edges represent control dependency between nodes;
determining, by the query processor operating on the computing device, a set of producer statements and a set of consumer statements from the control flow graph and data dependency graph, wherein a producer statement produces a variable for a consumer statement, and the consumer statement consumes the variable from the producer statement;
generating, by the query processor operating on the computing device, a statement graph for the procedure representing relationships between the producer statements and consumer statements;
optimizing, by the query processor operating on the computing device, the statement graph by moving an operator from a consumer statement to a producer statement or by moving an operator from a producer statement to a consumer statement, wherein optimizing further comprises one or more of:
performing an intra-statement transformation to move statements within a single query tree; and
performing an inter-statement transformation comprising one or more safety checks to move statements between a plurality of query trees;
outputting, the query processor operating on the computing device, the optimized procedure based on the optimized statement graph; and
executing the optimized procedure to retrieve data from the database.

2. The method of claim 1, wherein receiving the statement graph comprises:
analyzing the procedure to determine statements in the procedure.

3. The method of claim 2, wherein analyzing the procedure comprises:
determining the control flow graph for the procedure based on a traversal path of execution from the procedure.

4. The method of claim 3, wherein analyzing the procedure comprises:
determining the data flow graph of data through the traversal path, wherein the data flow graph is used to determine whether a statement is a producer statement or a consumer statement.

5. The method of claim 1, wherein optimizing the statement graph comprises:
moving the operator from the consumer statement to the producer statement; and
updating a link between another statement and the consumer statement to point to the producer statement.

6. The method of claim 1, wherein optimizing the statement graph comprises:
moving the operator from the producer statement to the consumer statement; and
updating a link between another statement and the producer statement to point to the consumer statement.

7. The method of claim 1, wherein optimizing the statement graph comprises:
blocking moving the operator from the consumer statement to the producer statement or moving the operator from the producer statement to the consumer statement when a violation of a transformation rule occurs.

8. The method of claim 1, wherein optimizing the statement graph comprises:
blocking moving another operator from a consumer statement to a producer statement or moving the another operator from a producer statement to a consumer statement when a variable that is produced by a statement S0 and a statement S1, the variable is consumed by the statement S1 and a statement S2, and the statement S1 updates the value of variable before being consumed by statement S2.

9. The method of claim 1, wherein optimizing the statement graph comprises:
blocking moving of another operator from a consumer statement to a producer statement or another moving the another operator from a producer statement to a consumer statement when the moving of the another operator results in a loop head or branch head being empty.

10. The method of claim 1, wherein optimizing the statement graph comprises:
determining a first optimization rule; and
moving the operator from the consumer statement to the producer statement or moving the operator from the producer statement to the consumer statement based on the first optimization rule to form a first intermediate plan for the statement graph.

11. The method of claim 10, wherein optimizing the statement graph comprises:
determining a second optimization rule; and
moving another operator from a consumer statement to a producer statement or moving the another operator from a producer statement to a consumer statement based on the second optimization rule to form a second intermediate plan for the statement graph.

12. The method of claim 1, wherein optimizing the statement graph comprises:
performing an optimization of the procedure based on a plurality of optimization rules to alter the statement graph, wherein the statement graph is iteratively optimized by each optimization rule.

13. The method of claim 1, wherein optimizing the statement graph comprises:
performing the intra-statement transformation to move an operator within a statement to transform the operator into an operator that can be moved from the consumer statement to the producer statement or from the producer statement to the consumer statement.

14. The method of claim 1, wherein optimizing the statement graph comprises:
determining sibling statements that provide a same variable to a consumer statement; and
performing the intra-statement transformation to move an operator within one of the sibling statements to make the operator movable from the producer statement to the consumer statement or from the consumer statement to the producer statement.

15. A non-transitory computer-readable storage medium having stored thereon computer executable instructions, which when executed by a computing device, cause the computing device to be operable for:
receiving, by a query processor operating on a computing device, a query to retrieve data from a database, the query comprising software code including a procedure to determine which data to retrieve from the database, wherein the procedure comprises a plurality of statements;
generating, by the query processor operating on the computing device, a control flow graph and a data dependency graph, wherein the control flow graph represents an execution plan for the procedure and the data dependency graph is a directed acyclic graph comprising nodes and edges, wherein the nodes represent one or more of statements, tables, or input parameters and edges represent control dependency between nodes;
determining, by the query processor operating on the computing device, a set of producer statements and a set of consumer statements from the control flow graph and data dependency graph, wherein a producer statement produces a variable for a consumer statement, and the consumer statement consumes the variable from the producer statement;
generating, by the query processor operating on the computing device, a statement graph for the procedure representing relationships between the producer statements and consumer statements;
optimizing, by the query processor operating on the computing device, the statement graph by moving an operator from a consumer statement to a producer statement or by moving an operator from a producer statement to a consumer statement, wherein optimizing further comprises one or more of:
performing an intra-statement transformation to move statements within a single query tree; and
performing an inter-statement transformation comprising one or more safety checks to move statements between a plurality of query trees;
outputting, the query processor operating on the computing device, the optimized procedure based on the optimized statement graph; and
executing the optimized procedure to retrieve data from the database.

16. The non-transitory computer-readable storage medium of claim 15, wherein optimizing the statement graph comprises:
moving the operator from the consumer statement to the producer statement; and
updating a link between another statement and the consumer statement to point to the producer statement.

17. The non-transitory computer-readable storage medium of claim 15, wherein optimizing the statement graph comprises:
blocking moving another operator from a consumer statement to a producer statement or moving the another operator from a producer statement to a consumer statement when a variable that is produced by a statement S0 and a statement S1, the variable is consumed by the statement S1 and a statement S2, and the statement S1 updates the value of variable before being consumed by statement S2.

18. The non-transitory computer-readable storage medium of claim 15, wherein optimizing the statement graph comprises:
determining a first optimization rule;
moving the operator from the consumer statement to the producer statement or moving the operator from the producer statement to the consumer statement based on the first optimization rule to form a first intermediate plan for the statement graph;
determining a second optimization rule; and
moving another operator from a consumer statement to a producer statement or moving the another operator from a producer statement to a consumer statement based on the second optimization rule to form a second intermediate plan for the statement graph.

19. An apparatus comprising:
one or more computer processors; and
a computer-readable storage medium comprising instructions for controlling the one or more computer processors to be operable for:
receiving, by a query processor operating on a computing device, a query to retrieve data from a database, the query comprising software code including a procedure to determine which data to retrieve from the database, wherein the procedure comprises a plurality of statements;
generating, by the query processor operating on the computing device, a control flow graph and a data dependency graph, wherein the control flow graph represents an execution plan for the procedure and the data dependency graph is a directed acyclic graph comprising nodes and edges, wherein the nodes represent one or more of statements, tables, or input parameters and edges represent control dependency between nodes;
determining, by the query processor operating on the computing device, a set of producer statements and a set of consumer statements from the control flow graph and data dependency graph, wherein a producer statement produces a variable for a consumer statement, and the consumer statement consumes the variable from the producer statement;
generating, by the query processor operating on the computing device, a statement graph for the procedure representing relationships between the producer statements and consumer statements;
optimizing, by the query processor operating on the computing device, the statement graph by moving an operator from a consumer statement to a producer statement or by moving an operator from a producer statement to a consumer statement, wherein optimizing further comprises one or more of:
performing an intra-statement transformation to move statements within a single query tree; and
performing an inter-statement transformation comprising one or more safety checks to move statements between a plurality of query trees;
outputting, the query processor operating on the computing device, the optimized procedure based on the optimized statement graph; and
executing the optimized procedure to retrieve data from the database.

* * * * *